United States Patent Office 3,408,007
Patented Oct. 29, 1968

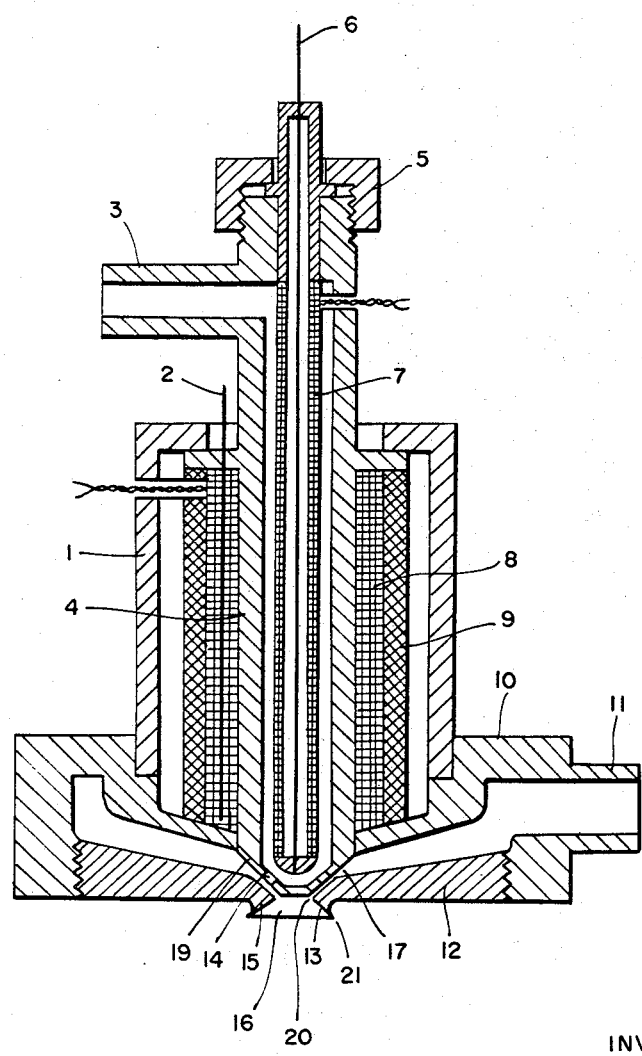

3,408,007
APPARATUS FOR ATOMIZING HIGHLY VISCOUS MATERIALS
Ludwig Raichle, Limburgerhof Pfalz, Karl Mahler, Hans-Juergen Mueller, Klaus Koch, and Wolfgang Immel, Ludwigshafen (Rhine), Friedrich Urban, Limburgerhof, Pfalz, and Johann Hotz, Ludwigshafen (Rhine), Germany, assignors to Badische Anilin- Soda-Fabrik Aktiengesellschaft, Ludwigshafen (Rhine), Germany
Filed Dec. 27, 1965, Ser. No. 516,401
Claims priority, application Germany, Dec. 29, 1964, B 79,925
4 Claims. (Cl. 239—132)

ABSTRACT OF THE DISCLOSURE

Spray nozzle for atomizing highly viscous substances with tubular, substance-conveying nozzle having thermocouple-controlled, internal and external heating elements and conical discharge end with apertures, annular, atomizing-gas passage about discharge end of substance nozzle with narrow, frusto-conical gap across frusto-conical tip formed by apertured, bottom wall of gas passage having thread mounting for varying width of gap.

---

This invention relates to apparatus for atomizing highly viscous substances. More particularly, it relates to apparatus for atomizing thermoplastics in molten condition.

Thermoplastic materials, for example plastics such as polyethylene or polypropylene, are in general solid at room temperature but soften with a decrease in viscosity when heated and return to their original solid condition upon recooling to room temperature. If chemical structure and consequently physical properties of the substance are to remain unchanged in the process, the temperature to which the substance may be heated is limited by the commencement of the degradation process, i.e. dissociation of the macromolecules into smaller molecules.

Owing to these properties of the substances, it has hitherto been possible only with difficulty to convert thermoplastic materials into powder form. The most obvious method, namely atomizing the material in the molten condition, could not hitherto be carried out, none of the prior art equipment for atomizing liquids and pastes being suitable owing to the high viscosity of the melt. It was therefore necessary to resort to grinding the said substances in solid condition, but even grinding has not given a satisfactory result for several reasons. The substance has to be cooled by solid carbon dioxide or liquid air to make it brittle, because otherwise the mill becomes hot and thus softens the material to be ground. The degree of mechanical efficiency of grinding is very low by reason of the plastic behavior of the material. Moreover, the powder obtained has a relatively great mean particle size and a wide particle spectrum.

The object of the present invention is to provide an appliance for atomizing highly viscous substances, for example thermoplastic materials.

This object is achieved by the apparatus according to this invention which comprises a nozzle for reception of the substance (and hereinafter called the substance nozzle) and having a conical end and a gas nozzle surrounding the substance nozzle, and is characterized by the fact that the conical end of the substance nozzle forms with the inner face of the lower lip of the mouth 16 of the nozzle a conical annular gap tapering toward the mouth of the nozzle, and outlet openings for the substance are provided in the conical end of the substance nozzle in the form of a circle and substantially perpendicular to the surface of the conical end, the angle α between the axis of the outlet openings for the substance and the generating line of the conical end being about 75° to 115°, and the outlet openings for the substance regarded axially are covered by the lower lip of the mouth of the nozzle.

Heating means, thermally insulated against the surroundings, is arranged externally of the substance nozzle.

The supply channel of the substance nozzle may be formed into an annular channel by inserting an internal heating rod.

To avoid adherence of the substance to the gas nozzle, the mouth 16 thereof is conically widened and has a sharp edge, the angle of aperture β of the widened portion being equal to the cone angle of the substance nozzle.

The body of the nozzle may be moved axially relatively to the end to vary the annular gap.

To impart a spiral movement to the gas after it has entered the nozzle, the gas supply pipe for supplying the atomizing gas is arranged tangentially on the gas nozzle.

During atomization, the molten substance is forced through the nozzles or substance outlet openings situated in the cone. After issuing from the nozzles, the substance is grasped by a high velocity inert gas current which is supplied perpendicularly to the outlet direction, preferably in spiral movement, and is atomized into very fine particles by the shear gradient.

An apparatus in accordance with a preferred embodiment of this invention will now be described by way of example with reference to the accompanying drawing.

The appliance consists in its main parts of a substance nozzle 4 and a gas nozzle 10. The substance nozzle 4 has a slim hollow cylinder and a lateral attachment 3 for supplying the substance at the upper end. The substance nozzle has a conical end 19. A circle of jets 14 is provided in the end 19 perpendicular to the conical wall. The substance nozzle 4 is connected with the gas nozzle 10 by an outer casing 1.

To ensure fine and uniform atomization, the substance should issue from the jets with the lowest possible viscosity. It should thus be forced out at the highest possible temperature without having had to be overheated. On the other hand this temperature should be low enough to prevent degradation from occurring. This is achieved by surrounding the substance nozzle 4 by an efficient external electrical heating element 8. To achieve good heat transfer, this heating element is closely associated with the substance nozzle 4. In order that conical end 19 in particular should be heated, because there the withdrawal of heat by the inert gas used for atomization has to be compensated, the external nozzle heating means 8 has been arranged as near the conical end as possible. The external heating means 8 is surrounded by an insulating sleeve 9 to avoid heat losses.

The external heating means 8 is not alone sufficient to ensure a uniform supply of substance to the outlet openings and to keep the substances at the necessary low viscosity at these places.

Therefore a second heating means 7 (the internal heating means) is provided inside the substance nozzle. It is connected with the substance nozzle 4 by a screwed cap 5. The internal heating means, by its rod shape, ensures that the substance to be atomized is conveyed from the supply pipe 3 to the conical end 19 in an annular channel. By reason of the small thickness of the layer and the high velocity, a uniform flow is achieved. The internal heating means extends into the conical end and is in a better position than the external heating means to compensate the heat withdrawal at the cone.

To regulate the temperature of the heating means and particularly to prevent burning out in the event of disturbances in the supply of substance, thermocouples 2 and 6 are incorporated in the two heating means which act to supervise the temperature in association with a regulator. The substance to be atomized is supplied in plastic condition under pressure through an attachment 3 to the inner space of the substance nozzle and is formed out through the jets 14.

The inert gas used for atomization is supplied through a pipe 11 to the substance issuing from the jets. The gas nozzle consists of a metallic member having a conical cavity. This narrows toward the outlet opening. The conical end 19 of the substance nozzle projects into the cavity in the gas nozzle 10 in such away that it forms a conical annular gap 17 with the lower lip of the mouth 16 of the gas nozzle 10. The annular gap narrows toward the outlet. The lower lip 15 of the mouth 16 covers the outlet openings in the conical end 19 of the substance nozzle.

To achieve a spiral gas flow having a velocity which increases toward the outlet, the gas is supplied through one or more inlet pipes attached tangentially to the gas nozzle. Owing to the conically narrowing annular gap, the gas achieves its maximum velocity at the point where it impinges vertically on the strands of substance issuing from the jets 14. The substance is very finely dispersed at this point and the particles are vigorously mixed with the gas stream so that a further dispersion occurs.

It is a prerequisite for this intense mixing that the gas stream laden with particles of substance should not expand until it is beyond the outlet openings. For this reason the lower lip 15 of the mouth 16 of the gas nozzle covers the outlet openings. The gas laden with particles of substance passes out, after having been atomized, through the circular mouth 16 formed by the sharp edge 20 of the lower lip. Owing to the high velocity, a region of reduced pressure forms around the mouth 16. The particles of substance may be deflected after leaving the nozzle and may be thrown against the bottom of the nozzle to which they remain adhering. They thus disturb the atomizing process because pieces break off from the adherent substance and coarse particles thus pass into the powder.

To prevent this, the mouth 16 is widened conically. This conically widening portion 13 ends in a sharp edge 21.

The bottom 12 of the nozzle is made as a separate part of the gas nozzle which screws into the nozzle body. This arrangement makes possible an adjustment of the width of the conical annular gap which in turn influences the ratio of the amounts of gas and substance and consequently influences the particle size. The possibility of adjustment is also advantageous when thermoplastics having different melt indexes are to be atomized with a single nozzle, because the most favorable ratio of gas to substance should be adjusted for each melt index.

The invention is illustrated by the following example.

EXAMPLE

High pressure polyethylene having a density of 0.92 g./cm.$^3$ and a melt index of 16 was atomized by means of the appliance described above using nitrogen as the atomizing gas. The polyethylene was melted by means of an extruder and forced into the nozzle.

*Experimental values*

Temperature of polyethylene prior to leaving the nozzle—200° C.
Throughput of polyethylene per hour—29.7 parts
Temperature of nitrogen—75° C.
Pressure of nitrogen ahead of the nozzle—31 at. gauge
Consumption of nitrogen per part of atomized polyethylene—1.3 parts.

*Result*

The atomized polyethylene was obtained as a fine powder having the following particle size distribution (determined by sieve analysis):

| Particle size in mm.: | Proportion in percent by weight |
|---|---|
| 0.63 to 0.4 | 6.66 |
| Less than 0.4 to 0.315 | 8.74 |
| Less than 0.315 to 0.25 | 16.82 |
| Less than 0.25 to 0.2 | 14.65 |
| Less than 0.2 to 0.16 | 14.13 |
| Less than 0.16 to 0.125 | 15.34 |
| Less than 0.125 to 0.09 | 11.97 |
| Less than 0.09 | 11.69 |

It may be seen from the particle size distribution that the spectrum was very narrow and about half of the powder had a particle size of less than 200 microns.

Experiments with high pressure polyethylene having a melt index of 3 gave almost the same particle size distribution. In this case the temperature of the polyethylene was 290° C.

We claim:
1. Apparatus for atomizing highly viscous substances comprising a tubular nozzle for the substance to be atomized, the downstream end of said nozzle having a conical wall, means defining an annular atomizing gas supply passage about the downstream end of said tubular nozzle, wall means of said passage opposite said conical wall defining therebetween a narrow, frustoconical gap, said conical wall having passages thereto for supplying the substance to be atomized to said gap, means for adjusting the width of said gap, an elongated heating element disposed in said tubular nozzle and extending into the vicinity of said conical wall, a second heating element in surrounding relationship with said tubular nozzle, and thermocouples in the respective heating elements adapted to prevent overheating of the spray apparatus.

2. Apparatus as claimed in claim 1, wherein said wall means defining said gas passage includes a wall extending across the downstream end of said tubular nozzle and being rotatably threaded in said wall means, said wall having at the central portion thereof a frusto-conical segment opposite said conical wall and defining therewith said frusto-conical, narrow gap and a central opening defining the mouth of the apparatus.

3. Apparatus as claimed in claim 2, wherein the juncture between said gap and said mouth is a sharp edge.

4. Apparatus for atomizing highly viscous substances with an inert gas under pressure, comprising a tubular nozzle having a conical end and a gas nozzle surrounding said conical end, said conical end of said tubular nozzle forming a frusto-conical annular gap with an inner face of a downstream wall including a nozzle mouth of said gap nozzle, said conical end of said tubular nozzle having outlet openings for said viscous substance, said openings being substantially perpendicular to the surface of said frusto-conical end, external heating means for heating said tubular nozzle, thermal-insulating means surrounding said external heating means, internal heating means within said tubular nozzle forming an annular channel for passage of the viscous substance to be atomized, and thermocouples connected to said internal heating means and to said external heating means, and means to change the width of said gap between said inner face and said conical end.

References Cited

UNITED STATES PATENTS

| 1,480,324 | 1/1924 | Wilson | 239—132 |
| 1,526,923 | 2/1925 | Meden | 239—434 |

FOREIGN PATENTS

| 889,209 | 2/1962 | Great Britain. |

M. HENSON WOOD, JR., *Primary Examiner.*

H. NATTER, *Assistant Examiner.*

U.S. DEPARTMENT OF COMMERCE

PATENT OFFICE

Washington. D.C. 20231

UNITED STATES PATENT OFFICE
CERTIFICATE OF CORRECTION

Patent No. 3,408,007                                                           October 29, 1968

Ludwig Raichle et al.

It is certified that error appears in the above identified patent and that said Letters Patent are hereby corrected as shown below:

Column 3, line 5, "formed" should read -- forced --; line 12, "away" should read -- a way --. Column 4, line 48, "gap" should read -- gas --.

Signed and sealed this 31st day of March 1970.

(SEAL)
Attest:

Edward M. Fletcher, Jr.                          WILLIAM E. SCHUYLER, JR.
Attesting Officer                                              Commissioner of Patents